Aug. 19, 1952  W. L. McGUINNESS  2,607,391
EMERGENCY TIRE CHAIN
Filed May 25, 1949
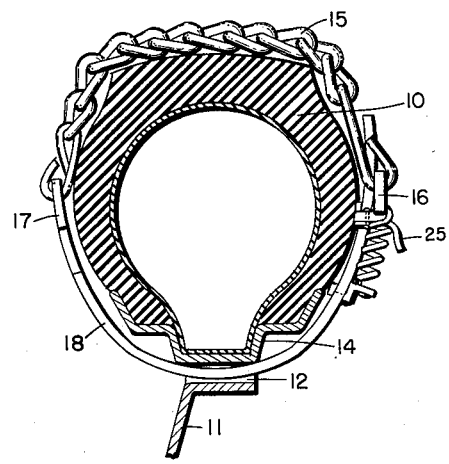
Fig. 1
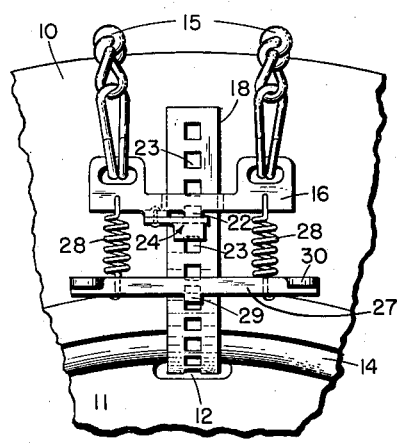
Fig. 2
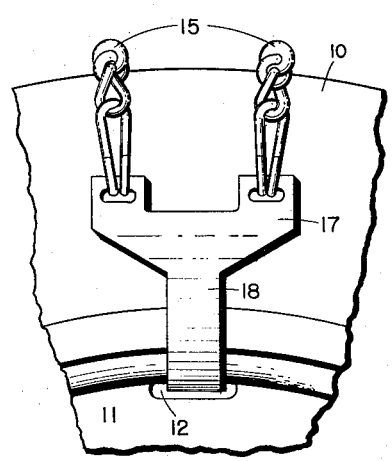
Fig. 3
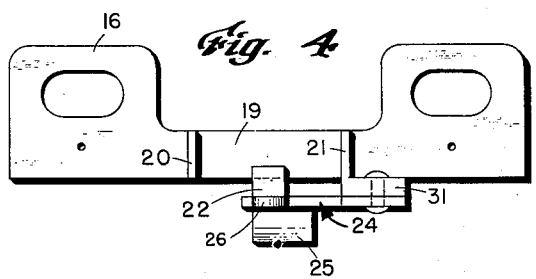
Fig. 4
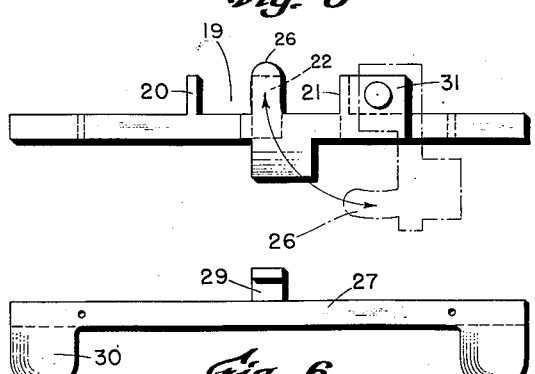
Fig. 5
Fig. 6
Walter L. McGuinness
Inventor
by [signature]
Attorney

Patented Aug. 19, 1952

2,607,391

UNITED STATES PATENT OFFICE 2,607,391

EMERGENCY TIRE CHAIN

Walter L. McGuinness, Waltham, Mass.

Application May 25, 1949, Serial No. 95,220

4 Claims. (Cl. 152—237)

My invention relates to a device for increasing the traction and skid resistance of automobile tires and the like, and more particularly concerns a device of this character which is adapted for application to tires mounted on disc wheels of the type having spaced slots around the outer margin of the disc.

A principal object of the invention is to provide a device, effective for the purpose indicated, which can be speedily applied to the tire, which will not tend to loosen, creep or become detached during use and which is quickly removed.

Generally described, my device in its preferred construction comprises, in addition to one or more road-engaging members, a cross piece at each end of such member or members and a substantially U-shaped felly-straddling band adapted to be passed through one of the apertures in the wheel to secure the unit made up of the road-engaging member or members and the cross pieces to the tire. One of the cross pieces, in the preferred construction, is either fixedly secured to the band at one end thereof or is integral with the band, while the other is formed to provide a guideway for the opposite leg of the band. This guideway, which is part of the means whereby the device is made fast to the tire, is a most important feature of the invention. The fastening means further include a hook or equivalent element associated with the same cross piece and adapted to be received in an aperture in the felly-straddling band. Most preferably, the construction comprises handle or lever means facilitating the bringing of the hook or the like into registry with the aperture and means for locking the hook or the like in the aperture.

I shall further describe my invention in its preferred embodiment with the aid of the accompanying drawings in which, Fig. 1 shows the device applied about a tire, the tire and part of the wheel being shown in section;

Fig. 2 is a view at right angles to the view of Fig. 1;

Fig. 3 is a view from the side of the tire opposite the side shown in Fig. 2;

Figs. 4 and 5 are detail views of the cross piece comprising the guideway, Fig. 4 showing the inner face of the piece, Fig. 5 being a worm's eye view; and Fig. 6 is a plan view of the lowermost cross member shown in Fig. 2.

Referring first particularly to Figs. 1–3, the tire 10 is shown as mounted on a disc wheel 11 having spaced apertures or slots 12. Rim 14 is integral with the wheel.

Extending across the tread of the tire are chains 15, the chains being connected at their ends through cross pieces 16 and 17 which are suitably apertured to receive the terminal links of the chains. Cross piece 17 is shown as integral with a band or strap 18 which is of essentially U-shape and which passes through the aperture 12, straddles the felly or rim 14, and partially encircles the tire.

If desired, cross piece 17 and band 18 may be detachably connected, as in hasp and staple fashion. Thus the cross piece may have a hook or knob associated therewith received in an aperture in the band. Alternatively, the band may comprise the hook, the cross piece being suitably apertured or provided with a suitable staple. The band is best formed by stamping from sheet metal. The metal must, of course, be capable of taking a set, but should possess a measure of resiliency.

Cross piece 16 presents a guideway 19 (see Figs. 4 and 5) formed by flanges 20 and 21, spaced equidistant from the ends of the cross piece, the width of the guideway approximating that of the band 18. The flanges may be formed integral with the cross piece or secured to the cross piece as by welding, for example.

In an alternative construction, the guideway may be formed, for example, by indenting the cross piece or as an incident of the formation of the cross piece by a die-stamping operation.

A hook element 22, fastened to or integral with the cross piece 16 is receivable in any one of the apertures 23 in the band 18. Such element will be noted (Fig. 4) as positioned mediate the lines followed by the boundaries of the guideway 19, i. e., mediate the vertical axes of the flanges 20 and 21.

Pivotally connected to the cross piece 16, or, more accurately, to a pivot block 31, fixed to or integral with flange 21, is a locking element generally indicated at 24 having a finger-grip portion 25 and a shim portion 26 of a thickness corresponding substantially to the distance between the lowermost surface of the hook 22 and the bottom margin of the aperture 23 in which the hook 22 is inserted (Fig. 2). The apertures 23 are provided in plurality to the end that the device may be applied to tires of different sizes.

Cross bar 27 serves as a handle member facilitating insertion of the hook 22 of cross piece 16 in an aperture providing a tight fit. This member is connected to cross piece 16 by springs 28 and comprises a hook 29, receivable in any of the apertures 23, and finger grooves 30.

In applying the described device, the free end of the band 18 is thrown over the tread of the tire and passed through the slot 12. The band is then pulled upwardly to properly position the chains across the tread and the connection is made. In making the connection, bar 27 is pulled down until the hook 22 is adjacent a proper aperture. During this stage the band 18 is pressed inwardly with the other hand so that when released, the band will snap forward to embrace the hook, the band itself at the same time becoming embraced by the flanges 20 and 21. Next the shim element 24 is swung into place and the bar 27 pulled further downwardly to tension the springs 28, the degree of tensioning being such as to preclude disengagement of the hook 29 from the aperture in which it is inserted. All of these operations are accomplished in a matter of seconds.

An important advantage of my device resides in the fact that the device will not be lost from the wheel even should both of the chains become broken. In the prior art construction, when one chain breaks the entire device is usually thrown from the wheel because of the resulting loss of tension and consequent disengagement of the fastening means.

My invention is not to be restricted to the precise details of construction shown in the drawings, since various changes and modifications may be made including changes and modifications other than those specifically mentioned without departing from the scope of the invention or sacrificing the advantages derived from its use.

I claim:

1. In an emergency traction device for automobile tires and the like, the combination with a plurality of road-engaging members, of a pair of cross pieces connecting said members at the ends thereof, one of said cross pieces presenting a guideway standing in transverse relation to the body of the cross piece and having a hook element positioned mediate the lines followed by the boundaries of said guideway, a substantially U-shaped felly-straddling band adapted to be passed through an aperture in the wheel on which the tire is mounted to secure the unit comprising said members and said cross pieces to the tire, one leg of said band having a plurality of apertures therein adapted to receive said hook element, and means for detachably locking said band in said guideway with said hook element extending into one of said apertures.

2. A device according to claim 1 further comprising handle means associated with the cross piece having said guideway and serving to facilitate placement of said hook element in the aperture, said handle means being separately detachably connectable to said band.

3. In an emergency traction device for automobile tires and the like, the combination with a plurality of road-engaging members, of a pair of cross pieces connecting said members at the ends thereof, one of said cross pieces presenting a centrally positioned guideway standing in transverse relation to the body of the cross piece and having a hook element positioned mediate the lines followed by the boundaries of said guideway, a substantially U-shaped felly-straddling band adapted to be passed through an aperture in the wheel on which the tire is mounted to secure the unit comprising said members and said cross pieces to the tire, one leg of said band having a plurality of apertures therein adapted to receive said hook element and means associated with said cross piece having the guideway for locking said band in said guideway with said hook element extending into one of said apertures, said means including a shim member adapted to be passed under said hook and receivable in said apertures.

4. In an emergency traction device for automobile tires and the like, the combination with a plurality of road-engaging members, of a pair of cross pieces connecting said members at the ends thereof, one of said cross pieces presenting a centrally positioned guideway standing in transverse relation to the body of the cross piece and having a hook element mediate the lines followed by the boundaries of said guideway, a substantially U-shaped felly-straddling band of a width conforming substantially to that of said guideway and adapted to be passed through an aperture in the wheel on which the tire is mounted to secure the unit comprising said members and said cross pieces to the tire, one leg of said band having a plurality of apertures therein adapted to receive said hook element, and means for detachably locking said band in said guideway with said hook element extending into one of said apertures, said means including a shim member pivotally fastened to the cross piece and receivable in said aperture.

WALTER L. McGUINNESS.

REFERENCES CITED

The following references are of record in the file of this patent:

UNITED STATES PATENTS

| Number | Name | Date |
|---|---|---|
| 2,453,426 | Freed | Nov. 9, 1948 |
| 2,461,737 | Huffman et al. | Feb. 15, 1949 |